United States Patent
Zakharov

(10) Patent No.: US 11,340,851 B1
(45) Date of Patent: May 24, 2022

(54) METHODS, SYSTEMS, AND STORAGE MEDIA FOR CHARACTERIZING PRINT VOLUME INFORMATION FOR A PRINTING ASSET

(71) Applicant: KYOCERA DOCUMENT SOLUTIONS INC., Osaka (JP)

(72) Inventor: Oleg Y. Zakharov, Walnut Creek, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/114,401

(22) Filed: Dec. 7, 2020

(51) Int. Cl.
 *G06F 3/12* (2006.01)
 *G06F 16/248* (2019.01)
 *G06F 16/2455* (2019.01)

(52) U.S. Cl.
 CPC .......... *G06F 3/1262* (2013.01); *G06F 3/1256* (2013.01); *G06F 3/1271* (2013.01); *G06F 3/1285* (2013.01); *G06F 16/248* (2019.01); *G06F 16/2455* (2019.01)

(58) Field of Classification Search
 None
 See application file for complete search history.

(56) References Cited

U.S. PATENT DOCUMENTS

| | | | |
|---|---|---|---|
| 2012/0053885 A1* | 3/2012 | Kato | G06F 3/1253 702/128 |
| 2012/0212778 A1* | 8/2012 | Sakai | G06K 15/402 358/1.15 |
| 2016/0210087 A1* | 7/2016 | Amir | G06F 3/124 |
| 2016/0216175 A1 | 7/2016 | Iwasaki et al. | |
| 2016/0255209 A1* | 9/2016 | Zakharov | G06T 11/206 358/1.15 |
| 2018/0013642 A1* | 1/2018 | Plaza | H04L 41/0893 |
| 2018/0268493 A1* | 9/2018 | Kamijima | G06Q 30/0283 |
| 2018/0314468 A1* | 11/2018 | Osadchyy | G06F 3/1234 |
| 2019/0014222 A1* | 1/2019 | O'Hagan | G06F 3/1285 |
| 2019/0079708 A1* | 3/2019 | Yamada | G06F 3/1263 |

* cited by examiner

*Primary Examiner* — Henok Shiferaw
(74) *Attorney, Agent, or Firm* — GrowIP Law Group LLC

(57) ABSTRACT

Methods, systems, and storage media for characterizing print volume information for a printing asset are disclosed. Exemplary implementations may: query a first computer-readable medium having stored thereon a first print volume data; query a second computer-readable medium having stored thereon a second print volume data; perform a statistical analysis based at least on the first and second print volume data to generate a print volume statistic; code a print volume classification for storage on a data storage device; and store the print volume classification on the data storage device such that the print volume classification is accessible via a structured query.

20 Claims, 7 Drawing Sheets

METHODS, SYSTEMS, AND STORAGE MEDIA FOR CHARACTERIZING PRINT VOLUME INFORMATION FOR A PRINTING ASSET

BACKGROUND

Modern printing environments operate in a manner such that a large number of printing assets need to be managed, and each individual printing asset may be responsible for an increasingly large print volume. When managing these environments, it is beneficial to be able to understand these print volume(s) and to forecast future print volume needs. In order to quickly and accurately understand and forecast print volume, print environment managers must be able to determine the state of print volumes across a large number of printing assets, in a large number of managed printing environments, quickly and accurately.

SUMMARY

Herein described are methods, systems, and storage media generally related to characterizing print volume information for a printing asset.

One aspect of the present disclosure relates to a method for characterizing print volume information for a printing asset. The method may include querying a first computer-readable medium having stored thereon a first print volume data. The first print volume data may be associated with a first print volume for at least the printing asset for a first time horizon. The first time horizon may include a week, a month, or a year. The method may include querying a second computer-readable medium having stored thereon a second print volume data. The second print volume data may be associated with a second print volume for at least the printing asset for a second time horizon. The second time horizon may include a timeframe analogous to the first time horizon. The method may include performing a statistical analysis based at least on the first and second print volume data to generate a print volume statistic. The method may include generating a print volume pseudocode, the print volume pseudocode comprising a print volume statistic indicator. The print volume statistic indicator may be associated with the print volume statistic. The print volume pseudocode may also include a time horizon indicator, the Time horizon indicator may be associated with a time horizon analogous to the first and second time horizons. The method may include coding a print volume classification according to the print volume pseudocode. The coding may be for storage on a data storage device. The method may include storing the print volume classification on the data storage device such that the print volume classification is accessible via a structured query. The method may include receiving a structured query, the structured query including a structured request for at least the print volume classification. The method may include decoding the structured query to determine the requested print volume classification. The method may include displaying the print volume classification to the user.

Another aspect of the present disclosure relates to a system configured for characterizing print volume information for a printing asset. The system may include one or more hardware processors configured by machine-readable instructions. The processor(s) may be configured to query a first computer-readable medium having stored thereon a first print volume data. The first print volume data may be associated with a first print volume for at least the print asset for a first time horizon. The first time horizon may include a week, a month, or a year. The processor(s) may be configured to query a second computer-readable medium having stored thereon a second print volume data. The second print volume data may be associated with a second print volume for at least the print asset for a second time horizon. The second time horizon may include a timeframe analogous to the first time horizon. The processor(s) may be configured to perform a statistical analysis based at least on the first and second print volume data to generate a print volume statistic. The processor(s) may be configured to generate a print volume pseudocode, the print volume pseudocode including a print volume statistic indicator. The print volume statistic indicator may be associated with the print volume statistic. The print volume pseudocode may also include a time horizon indicator, the Time horizon indicator may be associated with a time horizon analogous to the first and second time horizons. The processor(s) may be configured to cod a print volume classification accord to the print volume pseudocode. The cod may be for storage on a data storage device. The processor(s) may be configured to store the print volume classification on the data storage device such that the print volume classification is accessible via a structured query. The processor(s) may be configured to receive a structured query, the structured query including a structured request for at least the print volume classification. The processor(s) may be configured to decode the structured query to determine the requested print volume classification. The processor(s) may be configured to display the print volume classification to the user.

Yet another aspect of the present disclosure relates to a non-transient computer-readable storage medium having instructions embodied thereon, the instructions being executable by one or more processors to perform a method for characterizing print volume information for a printing asset. The method may include querying a first computer-readable medium having stored thereon a first print volume data. The first print volume data may be associated with a first print volume for at least the printing asset for a first time horizon. The first time horizon may include a week, a month, or a year. The method may include querying a second computer-readable medium having stored thereon a second print volume data. The second print volume data may be associated with a second print volume for at least the printing asset for a second time horizon. The second time horizon may include a timeframe analogous to the first time horizon. The method may include performing a statistical analysis based at least on the first and second print volume data to generate a print volume statistic. The method may include generating a print volume pseudocode, the print volume pseudocode comprising a print volume statistic indicator. The print volume statistic indicator may be associated with the print volume statistic. The print volume pseudocode may also include a time horizon indicator, the Time horizon indicator may be associated with a time horizon analogous to the first and second time horizons. The method may include coding a print volume classification according to the print volume pseudocode. The coding may be for storage on a data storage device. The method may include storing the print volume classification on the data storage device such that the print volume classification is accessible via a structured query. The method may include receiving a structured query, the structured query including a structured request for at least the print volume classification. The method may include decoding the structured query to determine the requested print volume classification. The method may include displaying the print volume classification to the user.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

DETAILED DESCRIPTION

Figure 1:
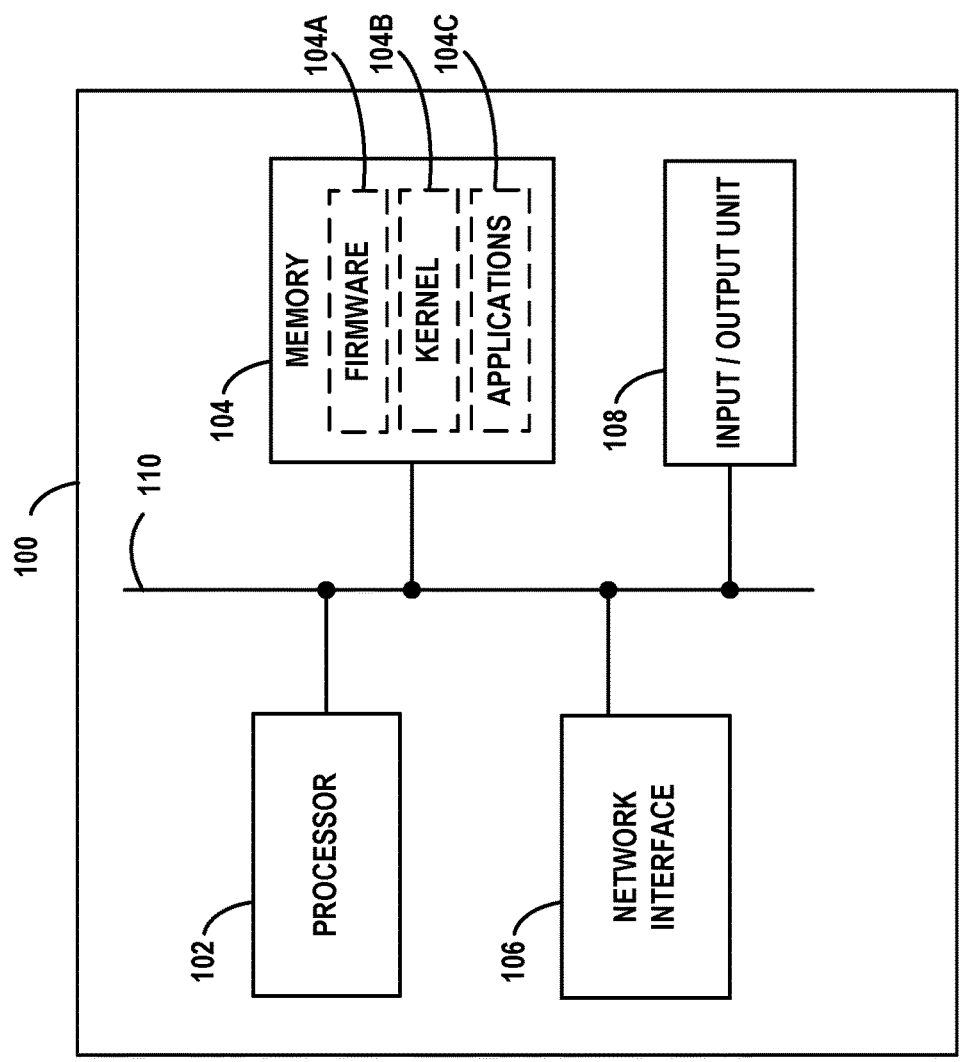
FIG. 1 illustrates a simplified block diagram exemplifying a computing device. illustrating some of the components that could be included in a computing device arranged to operate in accordance with the embodiments herein

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

Modern printing environments operate in a manner such that a large number of printing assets need to be managed, and each individual printing asset may be responsible for an increasingly large print volume. When managing these environments, it is beneficial to be able to understand these print volume(s) and to forecast future print volume needs. In order to quickly and accurately understand and forecast print volume, print environment managers must be able to determine the state of a print volume quickly and accurately. This goes beyond access to numbers indicating the total volume, which may be large and difficult to interpret quickly. For example, if a single printing asset has a print volume of 10,000 for a first month and 8,000 for a second month, it may be difficult for a service or sales representative to be able to quickly and accurately understand these numbers in a meaningful way that impacts the representative's ability to forecast print volume for that printing asset.

These difficulties may be compounded over multiple time periods and multiple printing assets. Many modern printing environments include a large number of printing assets connected to one another and/or that must be managed together. Thus the print volume for a single printing environment may quickly grow beyond the ability of an ordinary dealer and/or sales representative to understand and/or appreciate quickly and accurately. Addressing these problems would allow for a descriptive classification of print volume that would allow for fast and accurate understand of print volume(s) and forecasting of print volume(s). Additionally, the solution would leverage the computing and networking capabilities of modern printing assets to assemble, store, communicate, and analyze large volumes of information across multiple printing assets.

For example, instead of using a traditional method of tracking print volume(s), where print volume(s) are tracked at each printing asset and at each time interval, a pseudocode may be generated that provides for high-level interpretation of print volume information. Notably, this pseudocode may be generated in such a manner as to include both a print volume statistic associated with a statistical analysis of historical print volumes and a time horizon indicator associated with the historical time periods. The print volume statistics may be based on a statistical analysis of historical print volume data (e.g., an indication of an increase or decrease in print volume over time, an average print volume over time, etc.), while the time horizon indicator may be any appropriate time horizon such as a week, month, or year. The generated pseudocode may be used to encode a print volume classification associated with the analyzed print volume and stored in a manner that makes the print volume classification accessible via a structured query for further decoding and analysis.

One aspect of the present disclosure relates to methods, systems, and storage media for characterizing print volume information for a printing asset. The methods, systems, and storage media may include one or more hardware processors configured by machine-readable instructions. The processor(s) may be configured to query a first computer-readable medium having stored thereon a first print volume data. The first print volume data may be associated with a first print volume for at least the printing asset for a first time horizon. The first time horizon may include a week, a month, or a year. The processor(s) may be configured to query a second computer-readable medium having stored thereon a second print volume data. The second print volume data may be associated with a second print volume for at least the printing asset for a second time horizon. The second time horizon may include a timeframe analogous to the first time horizon. The processor(s) may be configured to perform a statistical analysis based at least on the first and second print volume data to generate a print volume statistic. The processor(s) may be configured to code a print volume classification for storage on a data storage device. The coding may accord to a print volume pseudocode. The print volume pseudocode may include the print volume statistic and a time horizon indicator associated with a time horizon analogous to the first and second time horizons. The processor(s) may be configured to store the print volume classification on the data storage device such that the print volume classification is accessible via a structured query.

In some implementations, the first computer-readable medium and the second computer-readable medium may be located within one computer-readable medium. In some implementations, the first time horizon may be the time horizon immediately preceding the second time horizon.

In some implementations, the statistical analysis may include analyzing a change between the first print volume and the second print volume to generate a print volume change value. In some implementations, the print volume change value may include an indication of the percentage change between the first print volume and the second print volume.

In some implementations, the statistical analysis may include determining an average print volume for a plurality of time horizons preceding the second time horizon. In some implementations, the plurality of time horizons may include the first time horizon. In some implementations, the average print volume determined during the statistical analysis for a plurality of time horizons may precede the second time horizon. In some implementations, the plurality of time horizons may include the first time horizon.

In some implementations, the processor(s) may be configured to determine a standard deviation associated with the average print volume. In some implementations, the statistical analysis may be further based at least on the standard deviation associated with the average print volume.

In some implementations, the print volume statistic may include an indication of the relative change from the first print volume to the second print volume. In some implementations, the indication of the relative change from the first print volume to the second print volume may include an indication of an increase, a decrease, or no change. In some implementations, the indication of no change may occur when the relative change from the first print volume to the second print volume is within a threshold amount. In some implementations, the threshold amount may be associated with a standard deviation associated with an average print volume.

In some implementations, the print volume statistic may include a data structure including the information of a percentage change from the first print volume to the second print volume, an indication of the particular time horizon. In some implementations, the indication of the relative change from the first print volume to the second print volume.

In some implementations, the first print volume and the second print volume may be associated with a type of print volume of which the printing asset is capable. In some implementations, the type of print volume may include a black-and-white print volume or a color print volume.

In some implementations, the processor(s) may be configured to repeat certain operations for each printing asset in a plurality of printing assets. In some implementations, the processor(s) may be configured to for each printing asset in the plurality of printing assets, query a third computer-readable medium having stored thereon a printing asset category associated with the printing asset. In some implementations, the processor(s) may be configured to for each printing asset in the plurality of printing assets, determine a printing asset category associated with the printing asset.

In some implementations, the systems, methods, and storage media may further include grouping the plurality of printing assets into a plurality of groups according to the printing asset category. In some implementations, the printing asset category may include a black-and-white printer, a color printer, a network printer, or a copier.

In some implementations, the processor(s) may be configured to receive the structured query. In some implementations, the structured query may include a structured request for at least the print volume classification. In some implementations, the processor(s) may be configured to decode the structured query to determine the requested print volume classification. In some implementations, the processor(s) may be configured to decode the structured query to determine the requested print volume pseudocode. In some implementations, the processor(s) may be configured to decode the structured query to determine the requested print volume statistic and time horizon indicator. In some implementations, the processor(s) may be configured to decode the structured query to determine the requested print volume statistic, time horizon indicator, and printing asset from the plurality of printing assets.

In some implementations, the processor(s) may be configured to display the print volume classification to the user to aid the user in efficient analysis of print volume data and enable accurate and efficient further analysis of the print volume data.

II. Example Computing Devices and Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support various network architectures. The exact physical location, connectivity, and configuration of these computing devices may be unknown and/or unimportant. Accordingly, in some cases, the computing devices may be referred to as "cloud-based" devices that may be housed at various remote data center locations.

Figure 2:
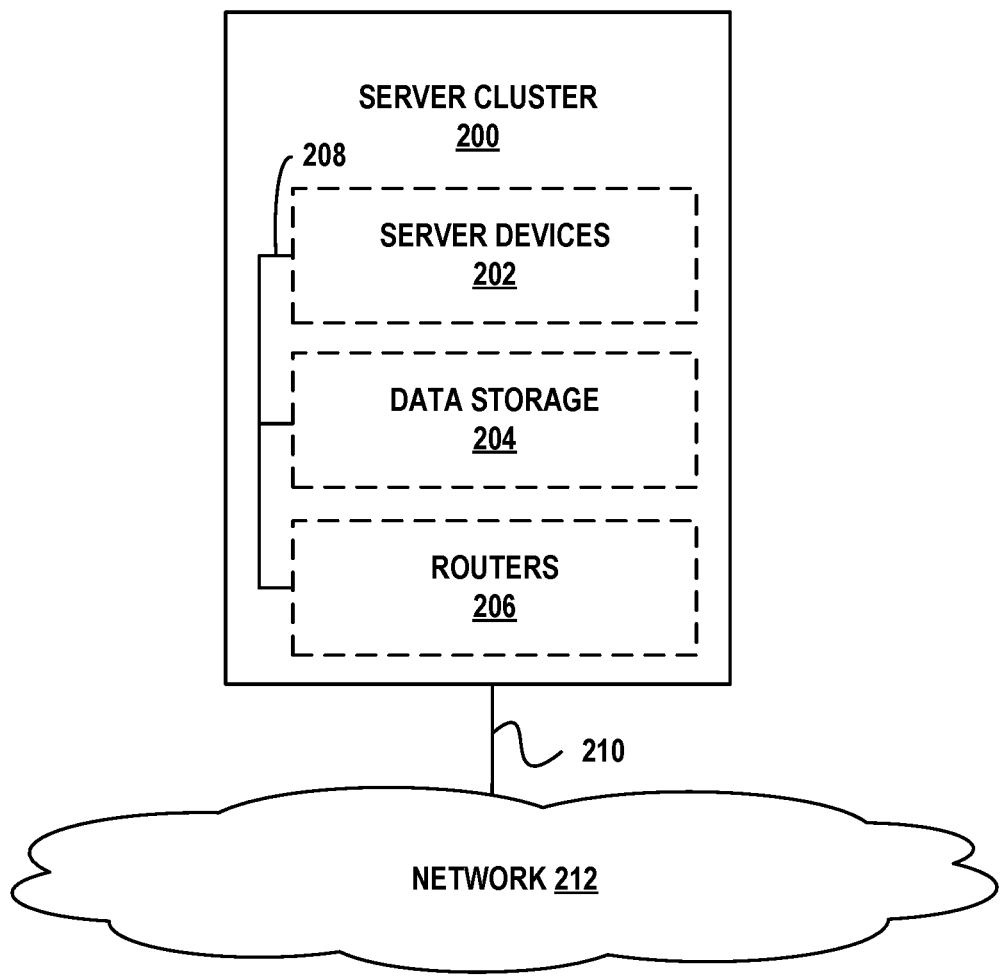
FIG. 2 illustrates a cloud-based server cluster in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of structured queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

The following embodiments describe architectural and functional aspects of example networks, as well as the features and advantages thereof. Moreover, the advantages provided by the embodiments herein are not limited to large enterprises and may be applicable to an enterprise, or any other type of organization, of any size.

III. Example Network Architectures

Figure 3:
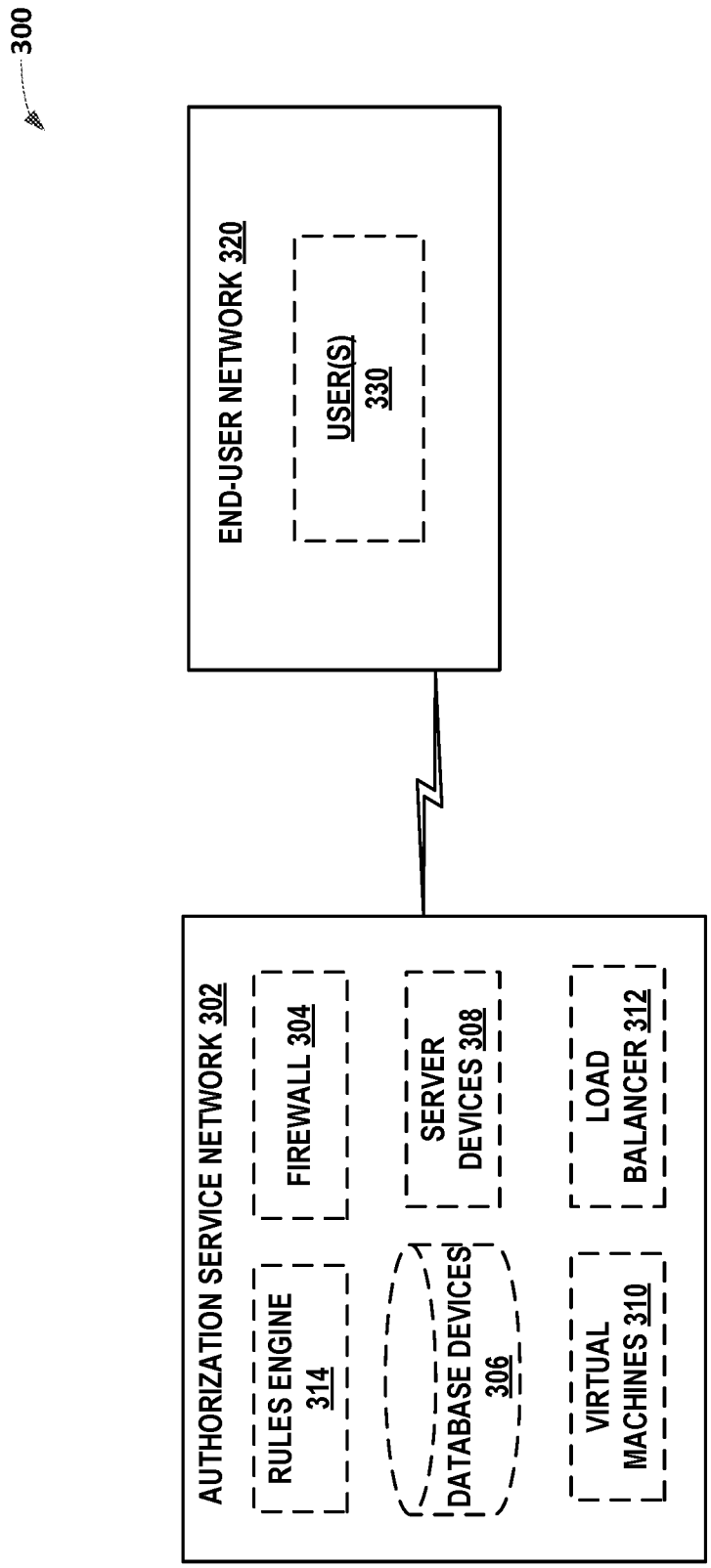
FIG. 3 illustrates a network architecture, in accordance with example embodiments.

FIG. 3 depicts a network architecture, in accordance with example embodiments. This architecture includes three main components, management network 300, end-user network 320, and user(s) 330.

Management network 300 may be a computing network that provides management services (e.g., management services for characterizing print volume information for a printing asset) to users, particularly to end-user network 320. Such services may be configured by users from end-user network 320. For example, by way of web-based portals, users may specify logical directives, as well as generate reports, view analytics, and perhaps perform other tasks. In order to support various capabilities as described herein, management network 300 may include rules engine 302, firewall 304, database devices 306, server devices 308, virtual machines 310, and load balancer 312, each of which may be embodied by computing device 100 and/or server cluster 200.

Rules engine 302 may be a configurable program that, contingent on current operating parameters of end-user network 320, establishes one or more operations that should be performed on behalf of end-user network 320. In particular, rules engine 302 may be configured by users from end-user network 320 to support custom operations.

Firewall 304 may be one or more specialized routers or server devices that protect management network 300 from unauthorized attempts to access the devices, applications, and services therein, while allowing authorized communication that is initiated from end-user network 300. Firewall 304 may also provide intrusion detection, web filtering, virus scanning, application-layer gateways, and other applications or services. Firewalls, such as firewall 310, typically deny all incoming communication sessions, unless such a session was ultimately initiated from behind the firewall (i.e., from a device on management network 300) or the firewall has been explicitly configured to support the session. In some embodiments (not shown in FIG. 3), management network 300 may include one or more virtual private network (VPN) gateways with which it communicates with end-user network 320.

Database devices 306 may be specialized hardware and/or software used to store data. For example, database devices 306 may include one or more relational databases (e.g., SQL), graph databases (e.g., neo4j), document databases (e.g., MongoDB), column databases (e.g., Cassandra) and/or other database models. In examples, database devices 306 may contain data related to the operations of management network 300 and/or end-user network 320.

Server devices 304 can be used for computational, data storage, communication, and service hosting operations. These servers may be virtualized (i.e., the servers may be virtual machines). In some cases, the server devices 308 may be physically present on management network 300. In other cases, the server devices 308 may be remote server devices hosted by third-party networks (e.g., AMAZON WEB SERVICES® and MICROSOFT® AZURE®).

Virtual machines 310 may be emulations of a computing system, and may mimic the functionality (e.g., processor, memory, and communication resources) of a physical computer. In some embodiments, virtual machines 310 may be managed by a centralized server device or application that facilitates allocation of physical computing resources to individual virtual machines, as well as performance and error reporting. Virtual machines 310 may be employed in order to allocate computing resources in an efficient, as needed fashion. Providers of virtual machines 310 may include VMWARE® and MICROSOFT®. In some embodiments, virtual machines 310 may support operating system level virtualization that allows for multiple isolated userspace instances, or "containers." Such type of virtualization may be supported by providers such as DOCKER® and in turn may be managed by a container orchestration software provider, such as KUBERNETES®.

Load balancer 312 may distribute traffic among one or more physical or virtual devices on management network 300. For instance, if management network 300 includes multiple physical or virtual computing devices, load balancer 312 may distribute network traffic and computational tasks across the multiple devices so that no one device is processing more tasks than the others (or more than its specified capabilities allow).

Notably, the configuration of management network 300 is provided as an example. Other configurations and additional devices may exist. For example management network 300 may contain additional components to those described above (e.g., routers, gateways, etc.). In addition, various client devices, such as personal computers or mobile device may be connected to management network 300 at any given time. Any component on management network 300 may be replicated across multiple computing devices to provide data duplication and increase capacity of services. Replicated components may be located at various computing locations to ensure high availability in case of power failure at one computing location. In some cases, management network 300 may consist of a few devices and a small number of components. In other deployments, management network 300 may span across multiple physical locations and hundreds of devices and components.

Figure 4:
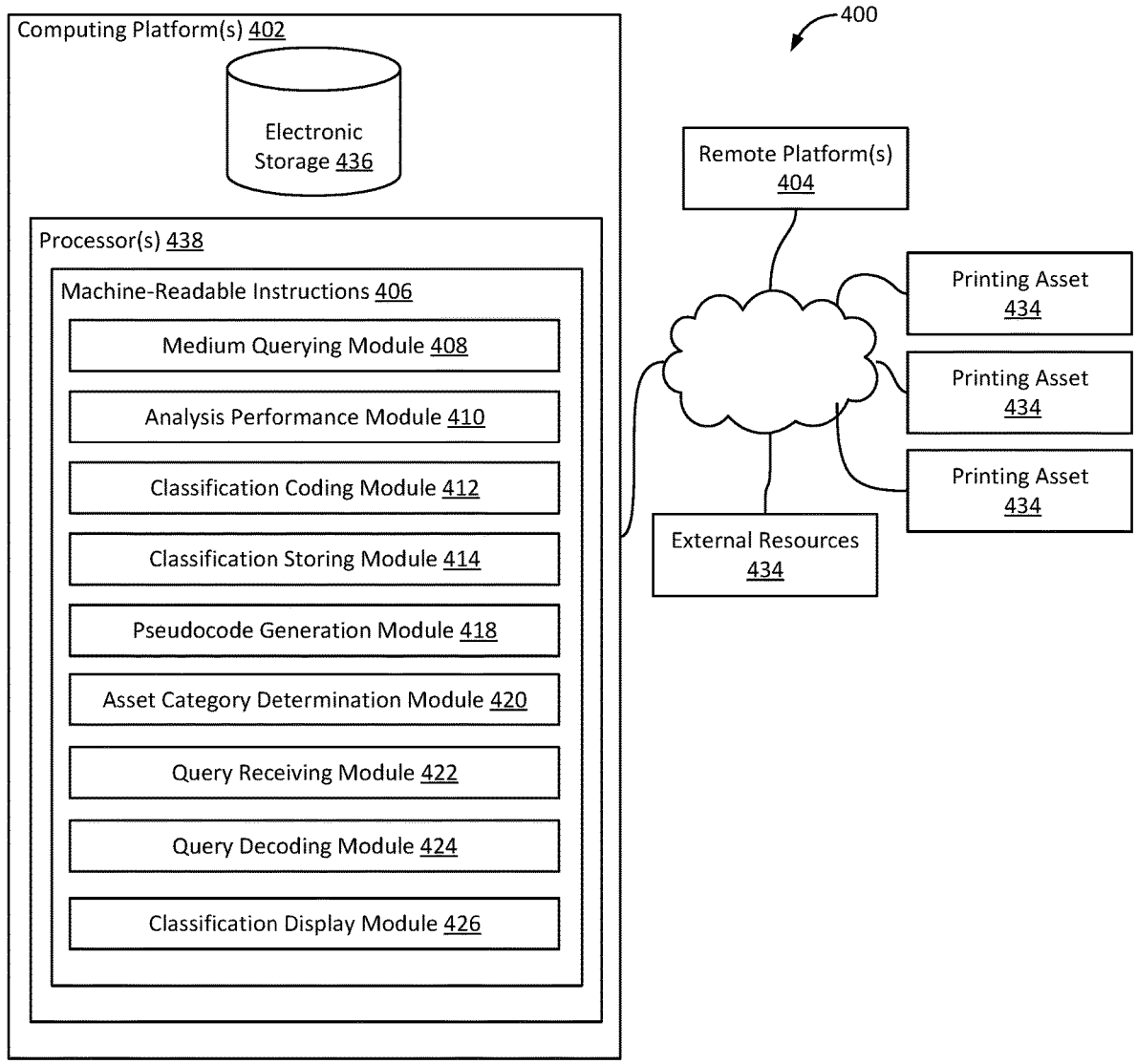
FIG. 4 illustrates a system configured for characterizing print volume information for one or more printing assets, in accordance with one or more implementations.

IV. Systems for Characterizing Print Volume Information for a Printing Asset FIG. 4 illustrates a system 400 configured for characterizing print volume information for one or more printing assets, in accordance with one or more implementations. In some implementations, system 400 may include one or more computing platform(s) 402, each of which may be embodied by computing device 100 and/or server cluster 200.

Computing platform(s) 402 may be configured to communicate with one or more remote computing platforms 404, each of which may be embodied by computing device 100 and/or server cluster 200, according to a client/server architecture and/or other architectures. Remote computing platform(s) 404 may be configured to communicate with other remote computing platforms via computing platform(s) 402 and/or according to a peer-to-peer architecture and/or other architectures. Users may access system via one or more computing platform(s) 402.

Additionally, one or more remote platform(s) 402 may be communicably coupled to one or more printing asset(s) 434.

For the purposes of this disclosure, a "printing asset" may refer to any printer, photocopier, fax machine, or scanner. (or any combination thereof). Generally, a printing asset may print, copy, fax, and/or scan one or more electronic document(s). In certain areas (e.g., large offices, universities, etc.), there may exist one or more relatively large managed print environments, each managed print environment including a relatively large number of print assets. Understanding the print volume needs among a large number of print assets may be difficult, and acquiring insight into the print volume needs in an efficient manner than enables further analysis (including improved forecasting) is critical.

In some implementations of system 400, computing platform(s) 402 may include a number of modules, as illustrated in FIG. 4 and detailed below. One exemplary module is asset category determination module 420. Asset category determination module 420 may be configured to, for each printing asset in the plurality of printing assets, determine a printing asset category associated with the printing asset. By way of non-limiting example, the printing asset category may include categories such as black-and-white printer, color printer, network printer, copier, etc. In some configurations, asset category determination module 420 may be further configured to group the plurality of printing assets into one or more groups according to the printing asset category.

Computing platform(s) 402 includes medium querying module 408. Medium querying module 408 may be configured to query a first computer-readable medium having stored thereon a first print volume data. The first print volume data may be associated with a first print volume for at least one printing asset for a first time horizon. By way of non-limiting example, the first time horizon may include a week, a month, or a year.

Medium querying module 408 may be configured to query a second computer-readable medium having stored thereon a second print volume data. The first computer-readable medium and the second computer-readable medium may be located within one computer-readable medium or may be located within different computer readable media. The first and second computer-readable media may be located within one device or located within different devices. The second print volume data may be associated with a second print volume for at least one printing asset for a second time horizon, where the second time horizon is analogous to the first time horizon. The first print volume and the second print volume may be associated with a type of print volume of which the printing asset is capable. By way of non-limiting example, the type of print volume may include a black-and-white print volume or a color print volume. For example, Table 1 below illustrates exemplary historical print volume data for a single printing asset, designated "AA." Table 1 illustrates three exemplary time periods—January, February, and March 2017—and a print volume associated with each time period. For example, AA may have had a print volume of 10,000 in January 2017, a print volume of 8,000 in February 2017, and a print volume of 10,000 in March 2017. The example of Table 1 further illustrates that the January 2017 print volume could be broken down into 5,000 black and white ("B/W") and 5,000 color, while the February 2017 print volume could be broken down into 5,000 B/W and 3,000 color, and the March 2017 print volume could be broken down into 6,000 B/W and 4,000 color.

TABLE 1

| Printing asset | Time Period | Total Print | B/W | Color |
|---|---|---|---|---|
| AA | January 2017 | 10,000 | 5,000 | 5,000 |
| AA | February 2017 | 8,000 | 5,000 | 3,000 |
| AA | March 2017 | 10,000 | 6,000 | 4,000 |

In certain implementations realizing the exemplary data of Table 1, the print volume data for each time period may be associated with the black and white print volume, the color volume, and/or some combination thereof.

Analysis performance module 410 may be configured to perform a statistical analysis based at least on the first and second print volume data to generate a print volume statistic. By way of a non-limiting example, the statistical analysis may include determining an average print volume for a plurality of time horizons preceding the second time horizon. To further illustrate the example, Table 1 above shows exemplary print volumes for three time periods—January, February, and March. In some implementations, analysis performance module 410 may be configured to perform a statistical analysis including determining a year-to-date average (i.e., the mean value of print volume data associated with January, February, and March), a monthly rolling average (i.e., the mean value of print volume data for January and February, and February and March), or other mean-based statistical analyses.

Figure 5:
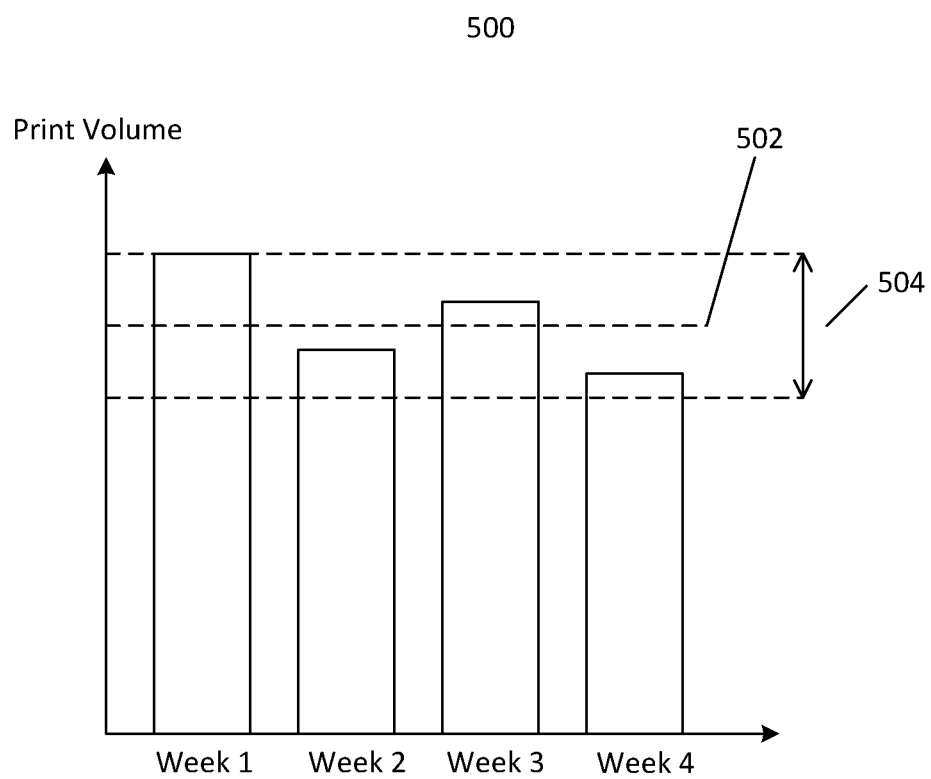
FIG. 5 illustrates an exemplary high-level diagram of changes in print volume for a printing asset over time.

In certain implementations, mean-based statistical analyses may also include statistical analyses that include and/or are based on a standard deviation calculated from among historical print volume data. For example, FIG. 5 illustrates an exemplary high-level diagram 500 of changes in print volume for a printing asset over time. Exemplary high-level diagram 500 illustrates four print volumes for four time periods: Week 1, Week 2, Week 3, and Week 4. Each time period has a corresponding print volume magnitude plotted against the Print Volume axis. Based on this historical print volume data, analysis performance module 410 may, in certain implementations, determine an average value 502 of the print volume for the printing asset from Weeks 1-4. Based on the average 502 and the historical print volume data, analysis performance module 410 may be further configured to determine a standard deviation 504, as illustrated in exemplary high-level diagram 500.

Referring again to FIG. 4, in some implementations, analysis of historical print volume data may provide data reflective of an increase and/or decrease in print volume data, but may be analyzed to provide data reflective of whether print volume data is stable or unstable. A stable print volume, aggregated by a specific time interval, may be a strong indicator that a print volume forecast will be accurate. By way of a non-limiting example, one parameter indicative of the stability of a print volume can be measured as a signal-to-noise ratio, calculated using the standard deviation. For example, a signal-to-noise ratio may be calculated as the ratio between the mean value of a set of print volumes over time to the standard deviation of the set of print volumes.

Figure 6:
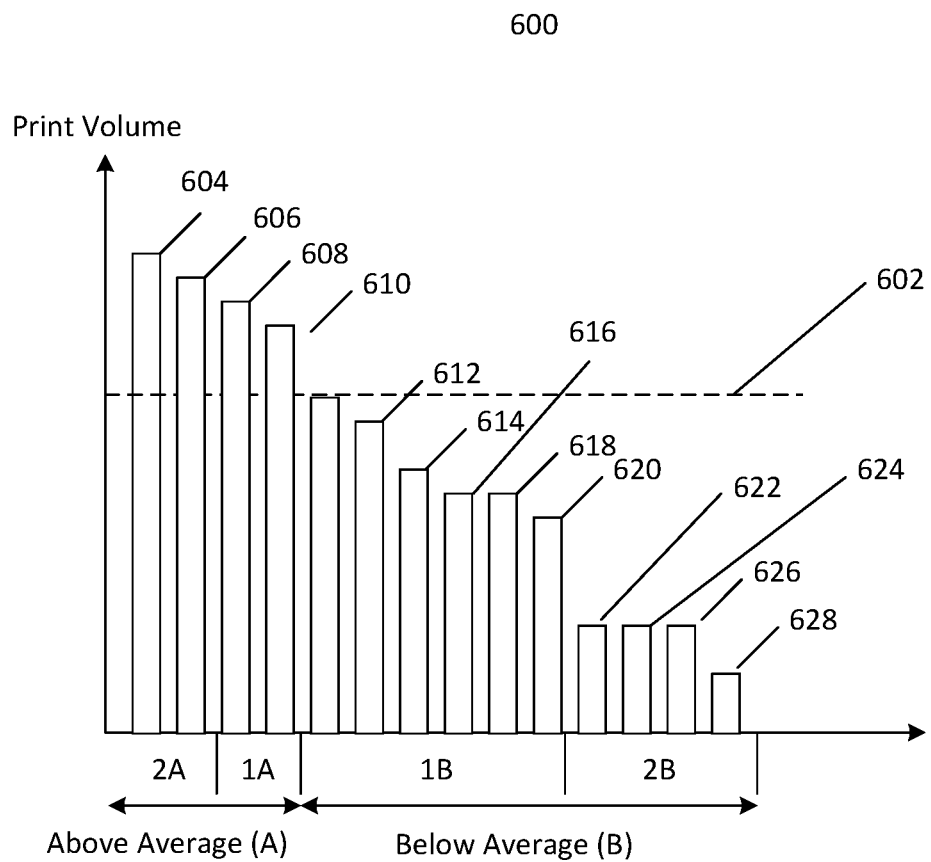
FIG. 6 illustrates an exemplary high-level diagram of the relative print volume data for a plurality of printing assets, grouped by a number of standard deviations above or below an average of the print volumes for the plurality of printing assets, in accordance with certain implementations.

For example, FIG. 6 illustrates an exemplary high-level diagram 600 of the relative print volume data for a plurality of printing assets, grouped by a number of standard deviations above or below an average of the print volumes for the plurality of printing assets, in accordance with certain implementations. High-level diagram 600 illustrates a number of exemplary print volume data representations 604, 606, 608, 610, 612, 614, 616, 618, 620, 622, 624, 626, 628 plotted on a coordinate plane in decreasing magnitude of print volume. In the exemplary diagram 600, the average of the print volumes 602 is illustrated by a dashed line. The exemplary print volume data representations 604, 606, 608, 610, 612, 614, 616, 618, 620, 622, 624, 626, 628 may then be grouped into two subsets: print volumes 604, 606, 608, 610, which are above average, and print volumes 612, 614, 616, 618, 620, 622, 624, 626, 628, which are below average. Further, the above average print volumes 604, 606, 608, 610 may be further sub-divided into two subsets: print volumes 604, 606, which are two standard deviations above average (denoted as "2A" in FIG. 6), and print volumes 608, 610, which are one standard deviation above average (denoted as "1A" in FIG. 6). Likewise, the below average print volumes 612, 614, 616, 618, 620, 622, 624, 626, 628 may be further sub-divided into two subsets: print volumes 612, 614, 616, 618, 620, which are one standard deviation below average (denoted as "1B" in FIG. 6), and print volumes 622, 624, 626, 628, which are two standard deviations below average (denoted as "2B" in FIG. 6).

Referring again to FIG. 4, as an additional non-limiting example, the statistical analysis may include analyzing a change over time between the first print volume and the second print volume in order to generate a print volume change value. The print volume change value may include an indication of the percentage change between the first print volume and the second print volume. The indication of the relative change from the first print volume to the second print volume may include an indication of an increase, a decrease, or no change. For example, referring again to the illustrative data provided in Table 1, printing asset AA may have associated therewith print volume data associated with a number of time periods (e.g., January-March 2017). In some implementations, analysis performance module 410 may be configured to determine an indication of increase, decrease, and/or no change in print volume from one time period to another. For example, using the illustrative data of Table 1, analysis performance module 410 may be configured to identify a 20% decrease in total print volume from January 2017 to February 2017 and a 25% increase in total print volume from February 2017 to March 2017. Additionally, as noted above, this analysis of print volume data may be associated with a subset of the total print volume (e.g., to indicate no change in the black and white print volume from January 2017 to February 2017 and a 20% increase in black and white print volume from February 2017 to March 2017).

In certain implementations, the statistical analysis may use both a mean-based print volume analysis and a print volume change analysis as part of the statistical analysis. For example, an indication of no change in the relative print volume may indicate that the relative change from the first print volume to the second print volume is within a threshold amount. The threshold amount may be associated with a standard deviation associated with an average print volume.

As detailed above with respect to FIGS. 1-3, in certain implementations, the printing asset may be one of a plurality of printing assets within a managed printing environment. In some implementations of a multiple printing asset environment, medium querying module 408 and analysis performance module 410 may be further configured to perform each of their respective functions for one or more of the plurality of printing assets. By way of non-limiting example, a first managed printing environment may include a first plurality of printing assets, while a second managed printing environment may include a second plurality of printing assets. Each managed printing environment may, for example, determine an average print volume for all of the printing assets in its respective environment over an appropriate time frame. Table 2 below illustrates exemplary data that demonstrates two managed printing environments, denoted "West" and "East," along with exemplary average print volumes (denoted "Average PV") for each environment in each of four quarters (denoted "Q1," "Q2," "Q3," and "Q4").

TABLE 2

| Environment | Average PV Q1 | Average PV Q2 | Average PV Q3 | Average PV Q4 |
| --- | --- | --- | --- | --- |
| East | 30,000 | 35,000 | 40,000 | 35,000 |
| West | 35,000 | 35,000 | 37,000 | 30,000 |

Further, in certain implementations involving a plurality of printing assets, medium querying module 408 may be configured to, for one or more of the printing assets in the plurality of printing assets, query a third computer-readable medium having stored thereon a printing asset category associated with the printing asset. In other implementations, the printing asset category information and/or data may be stored and/or received from other appropriate computer-readable media.

Pseudocode generation module 418 may be configured to generate a print volume pseudocode. The print volume pseudocode may include the print volume statistic generated by analysis performance module 410 and a time horizon indicator associated with a time horizon analogous to the first and second time horizons. In some implementations, the pseudocode may be made up of letters, numbers, symbols, and/or some appropriate combination thereof that may be used to form a pseudocode that may be used by certain users of a printing asset to understand and/or forecast print volume data associated with that printing asset.

By way of a non-limiting example, in certain implementations in which the print volume statistic is associated with a relative change in print volume from a first time period to a second time period, an exemplary pseudocode may include a combination of letters and numbers to indicate the relative change. For example, referring again to the exemplary data of Table 1, in order to represent the 20% decrease in total print volume for AA from January 2017 to February 2017, the pseudocode might be a combination of letters and numbers that are a shorthand for this information, e.g., "20B." In this example, the "20" represents the magnitude of the relative change (e.g., 20%), while the "B" represents the direction of the relative change (e.g., below the previous month). Other exemplary pseudocodes may convey similar information (e.g., 20L—20% less, etc.) without departing from the scope of the present disclosure.

In addition to the print volume statistic, the pseudocode may also include a time horizon indicator. For the purposes of the present disclosure, "time horizon" is used to indicate any appropriate time period over which a print volume may be measured. For example, a time horizon may be an hour, day, week, month, quarter, year, etc. The specific time horizon chosen for a specific implementation will depend on the design and operational goals of the user(s) of the printing asset(s). With respect to the pseudocode generated by pseudocode generation module 418, the pseudocode may also include an indication of the time horizon associated with a particular print volume statistic. Referring again to the exemplary pseudocode described above, the time horizon of interest in a month. Thus, the exemplary pseudocode may include an indicator of a month, such as "M." Other exemplary pseudocodes may convey similar information (e.g., "30" for 30 days, "60" for 60 days, etc.) without departing from the scope of the present disclosure.

In certain implementations, the pseudocode generated by pseudocode generation module 418 will be a combination of the pseudocode associated with the print volume statistic and the pseudocode associated with the relevant time horizon. Referring again to the exemplary pseudocode described above, the exemplary pseudocode for printing asset AA for February 2017 may be "20BM," which indicates the information "the print volume for February 2017 is 20% below the previous month." Other exemplary pseudocodes may convey similar information (e.g., 20L30, etc.) without departing from the scope of the present disclosure. Applying the exemplary pseudocode to the March 2017 data in FIG. 1, the pseudocode associated with the total print volume for March 2017 may be "25AM," which indicates the information "the print volume for March 2017 is 25% above the previous month." Other exemplary pseudocodes may convey similar information (e.g., 25M30, etc.) without departing from the scope of the present disclosure.

In certain implementations, the same exemplary pseudocode may be applied to a plurality of printing assets across a plurality of managed printing environments. In the same or alternative implementations, the same exemplary pseudocode may be applied to a different time horizon. By way of non-limiting example, referring to the illustrative data of Table 2, the pseudocode associated with the print volume of "West" for the second quarter may be denoted as "17AQ" to denote the information "the print volume for the second quarter is 17% above the previous quarter." Likewise, the same exemplary pseudocode may be applied to an aggregate of print volume data across a plurality of printing assets and/or across a plurality of managed printing environments. Again referring to the exemplary data of Table 2, the exemplary pseudocode may be used to indicate the relative change in aggregate print volume across environments East and West. For example, the pseudocode associated with the combination of West and East for the fourth quarter may be denoted as "3BQ" to denote the information "the print volume for the fourth quarter is 3% below the previous quarter."

One of ordinary skill in the art would appreciate that the portion of the pseudocode corresponding to the print volume statistic may be modified in any particular implementation to accommodate particular design needs regarding the accuracy of the print volume statistic as represented by the pseudocode. For example, referring again to the exemplary data of Table 2, the actual relative change for environment West in the second quarter is approximately 16.7%. Likewise, the actual relative change for the aggregate of West and East in the fourth quarter is approximately 2.6%. A specific implementation may round up, round down, make accommodations for additional significant digits, etc., according to the specific design needs of the implementation, without departing from the scope of the present disclosure.

As an additional non-limiting example, the pseudocode generated by pseudocode generation module 418 may be robust enough to enable a print volume to be encoded for multiple time horizons. For example, a pseudocode may allow a print volume to be encoded according to a relative change over a monthly time horizon and a yearly time horizon. Further, the pseudocode may include one or more additional indicators used to provide additional information in interpreting the print volume statistic and the time horizon indicator in the pseudocode. For example, referring again to the exemplary data of Table 2, a pseudocode may enable the print volume associated with environment East to be encoded both for a quarter and for a year. As an illustrative example, a print volume statistic associated with a quarter may indicate whether the print volume for that quarter had a relative change from the previous quarter—e.g., up, down, or the same. The associated pseudocode may indicate up as "U," same as "S," and down as "D." The pseudocode may associate the exemplary print volume statistic (e.g., U, S, or D) with a time horizon indicator. Thus, if East is up for the year, but down for the quarter, the pseudocode may indicate this information through a "YU" (i.e., up for the year) and a "MD" (i.e., down for the month).

Further, the pseudocode may also include additional information to indicate a threshold associated with relative change indicators. For example, it may have a greater impact on the accuracy of a print volume forecast to only indicate that a print volume is "up" or "down" when the relative print volume is up or down in excess of a certain threshold. As an illustration, a user may wish to set a threshold for relative change in print volume at 20%. If the print volume changes over the relevant time horizon in excess of 20% (or whatever the threshold may be), then the pseudocode may enable the print volume change to be represented by a change indicator (e.g., U for up, D for down, etc.). Still further, the pseudocode may have one or more thresholds associated with different time horizons. As an illustration, a system may have a first threshold (e.g., 10%) associated with a first time horizon (e.g., a year), and a second threshold (e.g., 20%) associated with a second time horizon (e.g., a month).

Classification coding module 412 may be configured to code a print volume classification for storage on a data storage device (for example, electronic storage 436). The coding may accord to a print volume pseudocode generated by pseudocode generation module 418. In certain implementations, classification coding module 412 may be configured to apply the pseudocode generated by pseudocode generation module 418 to the print volume data of one or more printing assets in order to store a specific instance of the pseudocode relevant to the print volume of a particular printing asset for one or more time horizon(s). For example, one of the exemplary pseudocodes described above indicates a print volume statistic by means of a relative print volume change indicator (e.g., up, down, or same) associated with a threshold (e.g., 10%, 20%, etc.) and a time horizon (e.g., month, year, etc.). Referring to the exemplary data of Table 1, classification coding module 412 may encode the print volume classification associated with the total print volume of March 2017 as "20%_MU" to indicate the information "for a threshold of 20%, the print volume was up from the previous month."

Classification storing module 414 may also be configured to store the print volume classification on the data storage device such that the print volume classification is accessible via a structured query. By way of a non-limiting example, classification storing module 414 may be configured to store the print volume classification on the data storage device such that the print volume classification is accessible via a SQL query. As another example, alphanumeric descriptors with well-defined structures allow a user to quickly and efficiently analyze trends among the print volumes of one or more printing assets. One approach to doing so is the use of regular expressions, a well-known technique applicable to structured text search and text analysis. Specifically, regular expressions may enable efficient location of text that includes specially structured phrases.

Additionally, many existing databases and database query languages also support text extraction based on regular expression criteria. For example, T-SQL (a database query language) will interpret the query "SELECT * FROM [Database] WHERE Name LIKE '[A-Z][A-Z] [_]%'" to be a request for all records in the field "Name" of the database "Database" that begin with two capital letters, followed by an underscore. As an illustration, the query above would return the Names "AB_anytext," "XF_othertext," and "OF_moreexampletext." The use of regular expressions enables efficient selection of well-structured text for further analysis.

Query receiving module 422 may be configured to receive a structured query from a user. In some implementations, the structured query may include a structured request for at least the print volume classification. As noted above, the structured request may take the form of, for example, a regular expression. By way of a non-limiting example, a user that supports a large managed printing environment may wish to know which printing assets in the managed printing environment have a print volume that has increased over the previous year, regardless of the threshold used to determine that relative change. In order to select this information, query receiving module 422 may be configured to receive the exemplary structured query "SELECT * FROM [Database] WHERE PrintVolumeDescription LIKE '[0-9][0-9][%_YU]'," where "Database" indicates a label associated with the data storage device on which the print volume classification is stored, "PrintVolumeDescription" indicates a label associated with the field in which the print volume classification is stored in Database, and the "[0-9][0-9][%_YU]" selects all entries in PrintVolumeDescription that have a two-digit integer, followed by "%_YU."

Query decoding module 424 may be configured to decode the structured query to determine the requested print volume pseudocode. By way of a non-limiting example, query decoding module 424 may be configured to decode the exemplary regular expression detailed above, "SELECT * FROM [Database] WHERE PrintVolumeDescription LIKE '[0-9][0-9][%_YU]'," in order to determine the desired print volume classification (e.g., all print volume classifications that have a two-digit integer, followed by "%_YU"). An exemplary request such as the one above may return data such as the exemplary data illustrated below in Table 3.

TABLE 3

| Device Serial Number | Print Volume Classification |
|---|---|
| SN23456777 | 10% YU |
| SN13456674 | 40% YU |
| SN93456476 | 15% YU |

As an additional example, a user may wish to determine which specific printing assets have a print volume that has decreased relative to the previous month, regardless of the threshold used to determine that decrease. In such an example, query decoding module 424 may decode the structured query "SELECT * FROM [Database] WHERE PrintVolumeDescription LIKE '[0-9][0-9][%_MD]'," in order to determine the desired print volume classification (e.g., all print volume classifications that have a two-digit integer, followed by "% MD"). An exemplary request such as the one above may return data such as the exemplary data illustrated below in Table 4.

TABLE 4

| Device Serial Number | Print Volume Classification |
|---|---|
| SN53456771 | 10% MD |
| SN83457673 | 05% MD |
| SN934564726 | 13% MD |

Classification display module 426 may be configured to display the print volume classification to the user. Classification display module 426 may be configured to display the print volume classification to the user in such a manner as to enable the user to quickly and accurate ascertain certain features of one or more print volume(s) associated with one or more printing asset(s), as detailed above with reference to FIGS. 1-6. By way of a non-limiting example, the information in Table 3 above and/or the information in Table 4 above may be displayed in a tabular format on the computer screen of a user following the user's appropriate structured query.

In some implementations, the print volume classification may be displayed on a monitor or other screen directly coupled to (and/or integrated into) computing platform 402. In the same or alternative implementations, the print volume classification may be displayed on a display device remotely coupled to computing platform and available to the user. For example, the display device may be part of a laptop computer, desktop computer, smartphone, etc. the user is using to access the functionality of computing platform 402. Further, in the same or alternative implementations, the print volume classification may be displayed as a narrative description, list, chart, table, graphic, infographic, or any other appropriate means. Still further, in the same or alternative implementations, the print volume classification may be displayed to the user through direct display to a display device, electronic communication (e.g., email, SMS message, instant message, etc.), voice communication (e.g., through an automated electronic communication-to-voice conversion), printout, or any other appropriate conveyance.

In some implementations, computing platform(s) 402, remote computing platform(s) 404, and/or external resources 434 may be operatively linked via one or more electronic communication links to allow for data transmission between devices. For example, such electronic communication links may be established, at least in part, via a network such as the Internet and/or other networks. The format of each respective data transmission can include one or more of a variety of different formats including: text formats, image formats, extensible mark-up language (XML), Simple Network Maintenance Protocol (SNMP) formats, database tables, a flat file format, a format associated with a page definition language, or another format. It will be appreciated that this is not intended to be limiting, and that the scope of this disclosure includes implementations in which computing platform(s) 402, remote computing platform(s) 404, and/or external resources 434 may be operatively linked via some other communication media.

A given client computing platform 404 may include one or more processors configured to execute computer program modules. The computer program modules may be configured to enable an expert or user associated with the given client computing platform 404 to interface with system 400 and/or external resources 434, and/or provide other functionality attributed herein to remote computing platform(s) 404. By way of non-limiting example, the given client computing platform 404 may include one or more of a desktop computer, a laptop computer, a handheld computer, a tablet computing platform, a NetBook, a Smartphone, a gaming console, and/or other computing platforms.

External resources 434 may include sources of information outside of system 400, external entities participating with system 400, and/or other resources. In some implementations, some or all of the functionality attributed herein to external resources 434 may be provided by resources included in system 400.

Computing platform(s) 402 may include electronic storage 436, one or more processors 438, and/or other components. Computing platform(s) 402 may include communication lines, or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

In implementations in which computing platform(s) 402 provide print server functionality, computing platform(s) 402 can be configured to provide services related to some or all of the functionality for one or more document solutions and managed print services; e.g., functionality for accounting and maintenance of solutions and services, functionality for document workflows, such as processing forms, hardcopy signatures, client authentication/access functions, user interface functionality, local and/or remote network based storage management involving linked devices. For example, computing platform(s) 402 can provide functionality related to a print server in order to process jobs (e.g., spool job-related data, route jobs, provide user and/or server-related accounting for jobs, verify/enforce authentication and authorization rules related to jobs) and store data related to printing assets. The jobs processed by a print server can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing asset (e.g., creating, reviewing, updating, assigning, reassigning, communicating, and/or deleting trouble tickets related to errors/complaints about printing assets and/or other devices. The data can include data used in processing jobs (e.g., spooled data for print jobs, files for file-related requests, etc.), access-management related data, primary identification characteristics and/or model-dependent information about printing assets served by computing platform(s) 402 and perhaps other data.

Electronic storage 436 can include one or more computer-readable storage media configured to store data and/or instructions that can be read and/or accessed by at least one of processors 438. The one or more computer-readable storage media can include one or more volatile and/or non-volatile storage components, such as optical, magnetic, organic or other memory or disc storage, which can be integrated in whole or in part with at least one of processors 438. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, electronic storage 436 can be implemented using a single physical device (e.g., one optical, magnetic, organic or other memory or disk storage unit), while in other embodiments, electronic storage 436 can be implemented using two or more physical devices. The electronic storage media of electronic storage 436 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 436 may include one or more virtual storage resources (e.g., cloud storage, a virtual private network, and/or other virtual storage resources). Electronic storage 436 may store software algorithms, information determined by processor(s) 438, information received from computing platform(s) 402, information received from remote computing platform(s) 404, and/or other information that enables computing platform(s) 402 to function as described herein.

Processor(s) 438 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs)). Although processor(s) 438 is shown in FIG. 4 as a single entity, this is for illustrative purposes only. In some implementations, processor(s) 438 may include a plurality of processing units. These processing units may be physically located within the same device, or processor(s) 438 may represent processing functionality of a plurality of devices operating in coordination. Processors 438 can be configured to execute computer-readable instructions that are contained in memory 436 and/or other instructions as described herein. For example, Processor(s) 438 may be configured to execute modules 408, 410, 412, 414, 416, 418, 420, 422, 424, 426, 428, 430, and/or 432, and/or other modules. Processor(s) 438 may be configured to execute modules 408, 410, 412, 414, 416, 418, 420, 422, 424, 426, 428, 430, and/or 432, and/or other modules by software; hardware; firmware; some combination of software, hardware, and/or firmware; and/or other mechanisms for configuring processing capabilities on processor(s) 438. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 418, 420, 422, 424, and 426 are illustrated in FIG. 4 as being implemented within a single processing unit, in implementations in which processor(s) 438 includes multiple processing units, one or more of modules 408, 410, 412, 414, 418, 420, 422, 424, and/or 426 may be implemented remotely from the other modules. The description of the functionality provided by the different modules 408, 410, 412, 414, 418, 420, 422, 424, and/or 426 described above is for illustrative purposes, and is not intended to be limiting, as any of modules 408, 410, 412, 414, 418, 420, 422, 424, and/or 426 may provide more or less functionality than is described. For example, one or more of modules 408, 410, 412, 414, 418, 420, 422, 424, and/or 426 may be eliminated, and some or all of its functionality may be provided by other ones of modules 408, 410, 412, 414, 418, 420, 422, 424, and/or 426. As another example, processor(s) 438 may be configured to execute one or more additional modules that may perform some or all of the functionality attributed below to one of modules 408, 410, 412, 414, 418, 420, 422, 424, and/or 426.

V. Methods for Characterizing Print Volume Information for a Printing Asset

Figure 7:
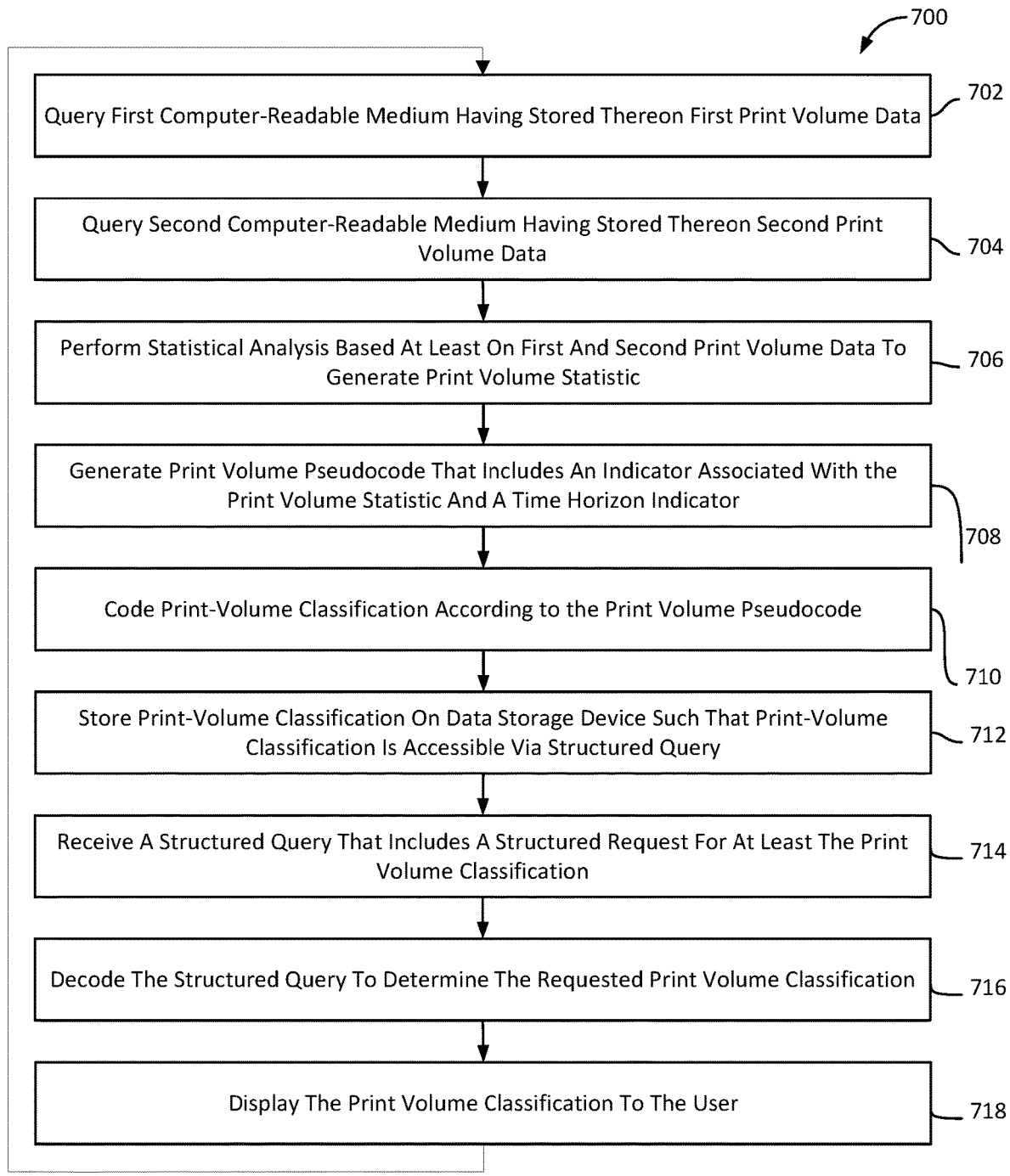
FIG. 7 illustrates an example flowchart for a method of characterizing print volume information for a printing asset, in accordance with one or more implementations.

FIG. 7 illustrates an example flowchart for a method 700 of characterizing print volume information for a printing asset, in accordance with one or more implementations. In some implementations, method 700 may be implemented in one or more processing devices (e.g., a digital processor, an analog processor, a digital circuit designed to process information, an analog circuit designed to process information, a state machine, and/or other mechanisms for electronically processing information). For example, the method 700 may be carried out by a computing device, such as computing device 100, a cluster of computing devices, such as server cluster 200, and/or one or more of the computing platform(s) 402 illustrated in FIG. 4. The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

In some implementations, method 700 may begin at 702. At 702, method 700 may query a first computer-readable medium having stored thereon a first print volume data. The first print volume data may be associated with a first print volume for at least one printing asset for a first time horizon. The first time horizon may be a week, a month, or a year, or any other appropriate time horizon. Method 700 may perform 702 via one or more hardware processors configured by machine-readable instructions including a module that is the same as or similar to medium querying module 408, in accordance with one or more implementations.

An operation 704 may include querying a second computer-readable medium having stored thereon a second print volume data. The second print volume data may be associated with a second print volume for at least the printing asset for a second time horizon. The time horizon may be a week, a month, or a year, or any other appropriate time horizon. Operation 704 may be performed by one or more hardware processors configured by machine-readable instructions including a module that is the same as or similar to medium querying module 408, in accordance with one or more implementations.

An operation 706 may include performing a statistical analysis based at least on the first and second print volume data to generate a print volume statistic. Operation 706 may be performed by one or more hardware processors configured by machine-readable instructions including a module that is the same as or similar to analysis performance module 410, in accordance with one or more implementations.

An operation 708 may include generating a print volume pseudocode that includes an indicator associated with the print volume statistics and a time horizon indicator associated with a time horizon analogous to the first and second time horizons. Operation 708 may be performed by one or more hardware processors configured by machine-readable instructions including a module that is the same as or similar to pseudocode generation module 418.

An operation 710 may include coding a print volume classification according to the print volume pseudocode. Operation 710 may be performed by one or more hardware processors configured by machine-readable instructions including a module that is the same as or similar to classification coding module 412, in accordance with one or more implementations.

An operation 712 may include storing the print volume classification on a data storage device such that the print volume classification is accessible via a structured query. Operation 712 may be performed by one or more hardware processors configured by machine-readable instructions including a module that is the same as or similar to classification storing module 414, in accordance with one or more implementations.

An operation 714 may include receiving a structured query that includes a structured request for at least the print volume classification. Operation 714 may be performed by one or more hardware processors configured by machine-readable instructions including a module that is the same as or similar to query receiving module 422, in accordance with one or more implementations.

An operation 716 may include decoding the structured query to determine the requested print volume classification. Operation 712 may be performed by one or more hardware processors configured by machine-readable instructions including a module that is the same as or similar to query decoding module 424, in accordance with one or more implementations.

An operation 718 may include displaying the print volume classification to the user. Operation 712 may be performed by one or more hardware processors configured by machine-readable instructions including a module that is the same as or similar to classification display module 426, in accordance with one or more implementations.

In some implementations, method 700 may return to 702. For example, in some implementations involving a plurality of printing assets, method 700 may return to execute one or more operations of method 700 for each of the plurality of printing assets.

The operations of method 700 presented above are intended to be illustrative. In some implementations, method 700 may be accomplished with one or more additional operations not described, and/or without one or more of the operations discussed. For example, in some implementations, method 700 may not display the print volume classification to the user (i.e., operation 718). As an additional example, in certain implementations involving a plurality of printing assets, it may be necessary to only generate the print volume pseudocode once for all printing assets.

Additionally, the order in which the operations of method 700 are illustrated in FIG. 7 and described above is not intended to be limiting. For example, in certain implementations method 700 may generate the print volume pseudocode prior to querying any computer-readable media for print volume data.

Further, the example flowchart of FIG. 7 may be simplified by the removal and/or combination of any one or more of the features or operations shown therein. For example, in certain implementations method 700 may perform operations 702, 704 at substantially the same time.

VI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method for characterizing print volume information for a printing asset, the method comprising:

querying a first computer-readable medium having stored thereon a first print volume data, the first print volume data associated with a first print volume for at least the printing asset for a first time horizon, the first time horizon comprising a week, a month, or a year;

querying a second computer-readable medium having stored thereon a second print volume data, the second print volume data associated with a second print volume for at least the printing asset for a second time horizon, the second time horizon comprising a timeframe analogous to the first time horizon;

performing a statistical analysis based at least on the first and second print volume data to generate a print volume statistic;

generating a print volume pseudocode, the print volume pseudocode comprising a print volume statistic indicator, the print volume statistic indicator associated with the print volume statistic, and a time horizon indicator, the time horizon indicator associated with a time horizon analogous to the first and second time horizons, wherein the print volume pseudocode further comprises a combination of letters and numbers that correspond to data associated with a relative change in print volume from the first time horizon to the second time horizon, wherein the numbers represent the magnitude of the relative change in print volume from the first time horizon to the second time horizon, and the letters represent the direction of the relative change in print volume from the first time horizon to the second time horizon;

coding a print volume classification according to the print volume pseudocode, the coding for storage on a data storage device;

storing the print volume classification on the data storage device such that the print volume classification is accessible via structured query;

receiving a structured query, the structured query comprising a structured request for at least the print volume classification;

decoding the structured query to determine the requested print volume classification; and displaying the print volume classification on a display device.

2. The method of claim 1, wherein the first computer-readable medium and the second computer-readable medium are located within one computer-readable medium.

3. The method of claim 1, wherein the first time horizon is the time horizon immediately preceding the second time horizon.

4. The method of claim 1, wherein the statistical analysis comprises analyzing a change between the first print volume and the second print volume to generate a print volume change value.

5. The method of claim 1, wherein the statistical analysis comprises determining an average print volume for a plurality of time horizons preceding the second time horizon, the plurality of time horizons comprising the first time horizon.

6. The method of claim 5, further comprising determining a standard deviation associated with the average print volume.

7. The method of claim 6, wherein the statistical analysis is further based at least on the standard deviation associated with the average print volume.

8. A system configured for characterizing print volume information for a printing asset, the system comprising:
one or more hardware processors configured by machine-readable instructions to:
query a first computer-readable medium having stored thereon a first print volume data, the first print volume data associated with a first print volume for at least the printing asset for a first time horizon, the first time horizon comprising a week, a month, or a year;
query a second computer-readable medium having stored thereon a second print volume data, the second print volume data associated with a second print volume for at least the printing asset for a second time horizon, the second time horizon comprising a timeframe analogous to the first time horizon;
perform a statistical analysis based at least on the first and second print volume data to generate a print volume statistic;
generate a print volume pseudocode, the print volume pseudocode comprising a print volume statistic indicator, the print volume statistic indicator associated with the print volume statistic, and a time horizon indicator associated with a time horizon analogous to the first and second time horizons, wherein the print volume pseudocode further comprises a combination of letters and numbers that correspond to data associated with a relative change in print volume from the first time horizon to the second time horizon, wherein the numbers represent the magnitude of the relative change in print volume from the first time horizon to the second time horizon, and the letters represent the direction of the relative change in print volume from the first time horizon to the second time horizon;
code a print volume classification according to the print volume pseudocode, the coding for storage on a data storage device;
store the print volume classification on the data storage device such that the print volume classification is accessible via a structured query;
receive a structured query, the structured query comprising a structured request for at least the print volume classification;
decode the structured query to determine the requested print volume classification; and
display the print volume classification on a display device.

9. The system of claim 8, wherein the first computer-readable medium and the second computer-readable medium are located within one computer-readable medium.

10. The system of claim 8, wherein the first time horizon is the time horizon immediately preceding the second time horizon.

11. The system of claim 8, wherein the statistical analysis comprises analyzing a change between the first print volume and the second print volume to generate a print volume change value.

12. The system of claim 8, wherein the statistical analysis comprises determining an average print volume for a plurality of time horizons preceding the second time horizon, the plurality of time horizons comprising the first time horizon.

13. The system of claim 12, wherein the one or more hardware processors are further configured by machine-readable instructions to determine a standard deviation associated with the average print volume.

14. The system of claim 13, wherein the statistical analysis is further based at least on the standard deviation associated with the average print volume.

15. A non-transient computer-readable storage medium having instructions embodied thereon, the instructions being executable by one or more processors to perform a method for characterizing print volume information for a printing asset, the method comprising:
querying a first computer-readable medium having stored thereon a first print volume data, the first print volume data associated with a first print volume for at least the printing asset for a first time horizon, the first time horizon comprising a week, a month, or a year;
querying a second computer-readable medium having stored thereon a second print volume data, the second print volume data associated with a second print volume for at least the printing asset for a second time horizon, the second time horizon comprising a timeframe analogous to the first time horizon;
performing a statistical analysis based at least on the first and second print volume data to generate a print volume statistic;
generating a print volume pseudocode, the print volume pseudocode comprising a print volume statistic indicator, the print volume statistic indicator associated with the print volume statistic, and a time horizon indicator, the time horizon indicator associated with a time horizon analogous to the first and second time horizons, wherein the print volume pseudocode further comprises a combination of letters and numbers that correspond to data associated with a relative change in print volume from the first time horizon to the second time horizon, wherein the numbers represent the magnitude of the relative change in print volume from the first time horizon to the second time horizon, and the letters represent the direction of the relative change in print volume from the first time horizon to the second time horizon;
coding a print volume classification according to the print volume pseudocode, the coding for storage on a data storage device;
storing the print volume classification on the data storage device such that the print volume classification is accessible via a structured query;
storing the print volume classification on the data storage device such that the print volume classification is accessible via a structured query;
storing the print volume classification on the data storage device such that the print volume classification is accessible via a structured query;

storing the print volume classification on the data storage device such that the print volume classification is accessible via a structured query;

receiving a structured query, the structured query comprising a structured request for at least the print volume classification;

decoding the structured query to determine the requested print volume classification; and displaying the print volume classification on a display device.

16. The non-transient computer-readable storage medium of claim 15, wherein the first computer-readable medium and the second computer-readable medium are located within one computer-readable medium.

17. The non-transient computer-readable storage medium of claim 15, wherein the first time horizon is the time horizon immediately preceding the second time horizon.

18. The non-transient computer-readable storage medium of claim 15, wherein the statistical analysis comprises analyzing a change between the first print volume and the second print volume to generate a print volume change value.

19. The non-transient computer-readable storage medium of claim 15, wherein the statistical analysis comprises determining an average print volume for a plurality of time horizons preceding the second time horizon, the plurality of time horizons comprising the first time horizon.

20. The non-transient computer-readable storage medium of claim 19, wherein the method further comprises determining a standard deviation associated with the average print volume.

* * * * *